(12) United States Patent
Chen (10) Patent No.: US 8,910,970 B2
(45) Date of Patent: Dec. 16, 2014

(54) RAPIDLY COLLAPSIBLE STAND

(75) Inventor: Jung-Huo Chen, Taichung (TW)

(73) Assignee: Rexon Industrial Corp., Ltd., Taichung (TW)

( * ) Notice: Subject to any disclaimer, the term of this patent is extended or adjusted under 35 U.S.C. 154(b) by 224 days.

(21) Appl. No.: 13/490,539

(22) Filed: Jun. 7, 2012

(65) Prior Publication Data

US 2012/0313351 A1    Dec. 13, 2012

Related U.S. Application Data

(60) Provisional application No. 61/495,480, filed on Jun. 10, 2011.

(51) Int. Cl.
  *B62B 1/12* (2006.01)
  *B25H 1/04* (2006.01)

(52) U.S. Cl.
  CPC ... *B25H 1/04* (2013.01); *B62B 1/12* (2013.01); *B62B 2202/48* (2013.01)
  USPC ...................................................... 280/652

(58) Field of Classification Search
  CPC ............. B62B 1/12; B25H 1/04; F16M 11/38
  USPC ......... 269/17; 83/157, 471; 144/253.8, 286.1, 144/287; 108/15, 117, 118, 131, 133, 136, 108/2, 6; 248/164, 436, 439; 280/30, 652, 280/35, 641, 639, 651, 654, 43.1, 43.11, 280/47.131, 47.17, 47.18, 47.23, 47.24, 280/47.27, 47.28
  See application file for complete search history.

(56) References Cited

U.S. PATENT DOCUMENTS

| | | |
|---|---|---|
| 150,354 A | 4/1874 | Quinn |
| 336,156 A | 2/1886 | Pursell, Sr. |
| 1,608,924 A | 11/1926 | Brown |
| 1,703,282 A | 2/1929 | Skinner |
| 2,096,994 A | 10/1937 | Millen |
| 2,318,945 A | 5/1943 | Johannsen |
| 2,372,003 A | 3/1945 | Kennedy |
| 2,609,628 A | 9/1952 | Toth |
| 2,675,635 A | 4/1954 | Toth |
| 2,733,930 A | 2/1956 | Putterman |
| 2,768,866 A | 10/1956 | Amber |
| 2,880,047 A | 3/1959 | Haag |

(Continued)

FOREIGN PATENT DOCUMENTS

| | | |
|---|---|---|
| CN | 2573185 | 9/2003 |
| DE | 26 45 773 A1 | 4/1978 |

(Continued)

*Primary Examiner* — J. Allen Shriver, II
*Assistant Examiner* — Jacob Meyer
(74) *Attorney, Agent, or Firm* — Bacon & Thomas, PLLC (57) ABSTRACT

A rapidly collapsible stand includes a base frame, a pair of pivot members pivotally connected to a first side of the base frame, a first supporting frame connected to the pivot members, a first supporting unit pivotally connected between the base frame and the first supporting frame, a second supporting frame pivotally connected to the first supporting frame and a second supporting unit pivotally connected between the base frame and the second supporting frame. When operating the base frame, the second supporting frame is able to be extended away from the first supporting frame to an extended position by utilizing the linkage of the first supporting unit and the second supporting unit; or the second supporting frame is able to be received toward the first supporting frame to a received position by lifting up a handle portion of the first supporting frame.

20 Claims, 9 Drawing Sheets

(56) References Cited

U.S. PATENT DOCUMENTS

| | | | |
|---|---|---|---|
| 3,655,212 A | 4/1972 | Krass et al. | |
| 3,783,799 A | 1/1974 | Dupuis | |
| 3,805,710 A | 4/1974 | Leshem | |
| 3,930,663 A | 1/1976 | Scripter | |
| 4,079,679 A | 3/1978 | Bechtold | |
| 4,192,480 A | 3/1980 | Schmidt | |
| 4,202,284 A | 5/1980 | Parsons, Sr. | |
| 4,248,161 A | 2/1981 | Adair et al. | |
| 4,284,286 A * | 8/1981 | Lewallen | 280/30 |
| 4,369,985 A * | 1/1983 | Bourgraf et al. | 280/641 |
| 4,373,737 A | 2/1983 | Cory et al. | |
| 4,483,524 A | 11/1984 | Basten et al. | |
| 4,558,648 A | 12/1985 | Franklin et al. | |
| 4,561,622 A | 12/1985 | Heinzel | |
| 4,586,721 A | 5/1986 | Harada et al. | |
| 4,611,823 A | 9/1986 | Haas | |
| 4,726,405 A * | 2/1988 | Bassett | 144/287 |
| 4,728,118 A | 3/1988 | Haas | |
| 4,934,718 A * | 6/1990 | Voegele | 280/30 |
| 4,967,672 A | 11/1990 | Leather | |
| 4,969,496 A | 11/1990 | Romans | |
| 5,014,628 A | 5/1991 | Roberts | |
| 5,067,535 A * | 11/1991 | Wolff | 144/286.1 |
| 5,087,013 A | 2/1992 | Gress et al. | |
| 5,109,778 A | 5/1992 | Berkowitz et al. | |
| 5,154,441 A * | 10/1992 | White et al. | 280/645 |
| 5,275,365 A * | 1/1994 | Gerbel et al. | 248/129 |
| 5,323,713 A | 6/1994 | Luyk et al. | |
| 5,325,640 A | 7/1994 | Luedke et al. | |
| 5,325,794 A | 7/1994 | Hontani | |
| 5,421,272 A | 6/1995 | Wilmore | |
| 5,454,575 A | 10/1995 | Del Buono | |
| 5,484,154 A | 1/1996 | Ward | |
| 5,560,582 A | 10/1996 | Beelen | |
| 5,603,491 A | 2/1997 | Murrell | |
| 5,606,922 A | 3/1997 | Adams et al. | |
| 5,638,761 A | 6/1997 | Berkowitz et al. | |
| 5,816,374 A | 10/1998 | Hsien | |
| 5,862,898 A | 1/1999 | Chang | |
| 5,863,052 A * | 1/1999 | Roman | 280/30 |
| 5,927,745 A * | 7/1999 | Cunningham | 280/652 |
| 5,934,641 A | 8/1999 | Vince | |
| 6,019,050 A | 2/2000 | Ranta | |
| 6,102,369 A | 8/2000 | Monger | |
| 6,152,462 A * | 11/2000 | Barrett | 280/30 |
| 6,182,935 B1 | 2/2001 | Talesky | |
| 6,328,319 B1 * | 12/2001 | Stahler, Sr. | 280/47.18 |
| 6,345,829 B1 * | 2/2002 | Mueller | 280/47.18 |
| 6,360,797 B1 | 3/2002 | Brazell et al. | |
| 6,471,220 B1 | 10/2002 | Babb | |
| 6,530,583 B1 * | 3/2003 | Mueller | 280/47.18 |
| 6,578,856 B2 | 6/2003 | Kahle | |
| 6,637,761 B1 * | 10/2003 | Boettcher | 280/47.24 |
| D486,504 S | 2/2004 | Huang | |
| 6,722,293 B2 | 4/2004 | Lee | |
| 6,752,091 B2 | 6/2004 | Glover et al. | |
| 6,837,501 B1 * | 1/2005 | Hedrick | 280/30 |
| 6,886,836 B1 | 5/2005 | Wise | |
| 6,892,860 B2 | 5/2005 | Gibson et al. | |
| 6,899,306 B1 | 5/2005 | Huang | |
| 6,942,229 B2 | 9/2005 | Brazell et al. | |
| D519,747 S | 5/2006 | Wu | |
| 7,044,496 B2 | 5/2006 | Holmes | |
| D523,041 S | 6/2006 | Wise | |
| 7,059,616 B2 | 6/2006 | Wu | |
| 7,077,421 B2 | 7/2006 | Wu | |
| D527,200 S | 8/2006 | Wu | |
| 7,086,632 B2 | 8/2006 | Hsieh | |
| D529,252 S | 9/2006 | Wu | |
| 7,213,829 B2 | 5/2007 | Wu | |
| 7,222,865 B2 | 5/2007 | Chen et al. | |
| 7,255,355 B2 | 8/2007 | Chisholm et al. | |
| 7,278,646 B2 | 10/2007 | Chuang | |
| 7,308,858 B2 | 12/2007 | Lo et al. | |
| 7,334,592 B2 | 2/2008 | Tartaglia | |
| D566,735 S * | 4/2008 | Wise | D15/141 |
| 7,464,956 B2 | 12/2008 | Chen et al. | |
| 7,481,142 B2 * | 1/2009 | Kelly | 83/581 |
| 7,487,947 B2 | 2/2009 | Liu et al. | |
| 7,494,149 B2 | 2/2009 | Liu et al. | |
| D594,042 S | 6/2009 | Wise | |
| 7,584,935 B2 * | 9/2009 | Chen | 248/647 |
| 7,648,155 B1 * | 1/2010 | Wise | 280/639 |
| 7,681,893 B2 | 3/2010 | Liu et al. | |
| 7,731,205 B2 * | 6/2010 | Wise | 280/47.131 |
| 7,815,215 B1 * | 10/2010 | Lowe | 280/639 |
| 7,819,111 B2 * | 10/2010 | Wise | 125/13.01 |
| 7,849,966 B2 * | 12/2010 | Chiu | 182/153 |
| 7,882,870 B2 | 2/2011 | Lee | |
| 8,047,553 B2 * | 11/2011 | Voong | 280/30 |
| 8,096,519 B2 | 1/2012 | Tam et al. | |
| 8,100,430 B2 * | 1/2012 | Meyers et al. | 280/651 |
| 8,313,076 B2 * | 11/2012 | Tam et al. | 248/434 |
| 8,448,956 B2 * | 5/2013 | Wise | 280/30 |
| 8,464,994 B2 * | 6/2013 | Chiu | 248/439 |
| 8,517,413 B2 * | 8/2013 | Chen | 280/651 |
| 8,523,123 B2 * | 9/2013 | Chiu | 248/166 |
| 8,579,320 B2 * | 11/2013 | Chiu | 280/652 |
| 8,602,378 B2 * | 12/2013 | Tam et al. | 248/434 |
| 2005/0011421 A1 | 1/2005 | Zhang | |
| 2005/0045781 A1 | 3/2005 | Brazell | |
| 2005/0093258 A1 * | 5/2005 | Brazell et al. | 280/30 |
| 2005/0120849 A1 | 6/2005 | Lee | |
| 2005/0120922 A1 | 6/2005 | Brooks | |
| 2005/0133682 A1 | 6/2005 | Huang | |
| 2005/0183559 A1 | 8/2005 | Rue | |
| 2005/0194215 A1 | 9/2005 | Radermacher | |
| 2005/0199768 A1 | 9/2005 | Tam et al. | |
| 2006/0011191 A1 | 1/2006 | Vavricek | |
| 2006/0021552 A1 | 2/2006 | Pleiman et al. | |
| 2006/0021553 A1 | 2/2006 | Pleiman et al. | |
| 2006/0038383 A1 | 2/2006 | Wu | |
| 2006/0049614 A1 | 3/2006 | Shamah | |
| 2006/0071450 A1 | 4/2006 | Wu | |
| 2006/0075943 A1 | 4/2006 | Chen et al. | |
| 2006/0076756 A1 | 4/2006 | Wu | |
| 2006/0145045 A1 | 7/2006 | Chisholm et al. | |
| 2006/0163441 A1 * | 7/2006 | Wise | 248/637 |
| 2007/0012826 A1 * | 1/2007 | Liu et al. | 248/129 |
| 2007/0080488 A1 | 4/2007 | Chuang | |
| 2007/0089649 A1 * | 4/2007 | Chen et al. | 108/118 |
| 2007/0102892 A1 | 5/2007 | Chiu | |
| 2007/0197139 A1 * | 8/2007 | Wise | 451/41 |
| 2007/0221817 A1 * | 9/2007 | Chen | 248/676 |
| 2008/0067300 A1 * | 3/2008 | Liu et al. | 248/166 |
| 2008/0067786 A1 * | 3/2008 | Liu et al. | 280/639 |
| 2008/0115701 A1 | 5/2008 | Sugiura | |
| 2008/0257225 A1 | 10/2008 | Chianale | |
| 2009/0079152 A1 * | 3/2009 | Wise | 280/47.24 |
| 2009/0133780 A1 * | 5/2009 | Lee | 144/286.5 |
| 2009/0211419 A1 * | 8/2009 | Wise | 83/169 |
| 2009/0289429 A1 * | 11/2009 | Voong | 280/30 |
| 2010/0096530 A1 * | 4/2010 | Chiu | 248/439 |
| 2010/0171290 A1 * | 7/2010 | Wise | 280/652 |
| 2010/0213148 A1 * | 8/2010 | Chen | 211/85.8 |
| 2010/0229767 A1 * | 9/2010 | Chiu | 108/115 |
| 2012/0126501 A1 * | 5/2012 | Meyers et al. | 280/47.18 |
| 2012/0175861 A1 * | 7/2012 | Tam et al. | 280/652 |
| 2012/0193894 A1 * | 8/2012 | Fine | 280/651 |
| 2012/0217727 A1 * | 8/2012 | Lee | 280/652 |
| 2012/0313351 A1 * | 12/2012 | Chen | 280/652 |
| 2012/0318940 A1 * | 12/2012 | Chen | 248/164 |
| 2013/0075989 A1 * | 3/2013 | Bottazzi | 280/35 |
| 2013/0075990 A1 * | 3/2013 | Tam et al. | 280/35 |
| 2013/0175791 A1 * | 7/2013 | Chiu | 280/652 |

FOREIGN PATENT DOCUMENTS

| | | |
|---|---|---|
| EP | 0 532 132 A2 | 3/1993 |
| GB | 2 363 366 A | 12/2001 |
| WO | WO 03064115 A1 | 8/2003 |

* cited by examiner

RAPIDLY COLLAPSIBLE STAND

This application is a non-provisional application claiming the benefit from U.S. Provisional Application Ser. No. 61/495,480, filed on Jun. 10, 2011.

FIELD OF THE INVENTION

The present disclosure relates to stands and more specifically, to a collapsible stand for supporting machine tools.

For providing portability to conventional machine tools/power tools (i.e. table saws), conventional stands for supporting said machine tools are often provided with a collapsible structure for allowing the machine tools to be conveniently transported and used in a variety of different work sites.

U.S. Pat. Nos. 6,942,229, 5,560,582, and US Patent Application No. 2005/0199768A1 disclose various collapsible stands. Additionally, the Applicant's prior Taiwan Invention Patent No. I311520 disclosed a Supporting Stand for Machine Tools which includes a supporting platform adapted to support a machine tool, a pair of first legs pivotally disposed on one lateral side of the supporting platform, a pair of second legs pivotally disposed on another lateral side of the supporting platform and each of the second legs has one end pivotally and respectively connected with the first legs, a pair of resilient members respectively sleeved on the second legs; and a securing unit. The securing unit includes a handle slidably disposed on the supporting platform, two link members pivotally connected with the handle, two coupling members pivotally and respectively connected to the two link members, and two spring members disposed between the two coupling members and the supporting platform respectively. When the supporting stand is in an extended position, pulling the handle will drive the link members to pivotally rotate, the two link members will drive the coupling members to linearly approach each other, such that end tips of the link members are disengaged from the second legs for allowing the second legs to slide along a pair of sleeve members respectively such that the supporting stand is folded.

The aforementioned supporting stands are able to support the machine tool, can be easily extended and can be easily stored when not is use, Therefore, in view of the functionality and increasing demands for the supporting stands, the present disclosure has arisen.

SUMMARY

The present disclosure has been accomplished under the circumstances in view. It is therefore the main object of the present disclosure to provide a collapsible stand, which has a simple structure, is easy to operate, and can be quickly folded/extended.

To achieve these and other objects of the present disclosure, the collapsible stand in accordance with the present disclosure comprises a base frame which is adapted for supporting a machine tool. The base frame has a first lateral portion and a second lateral portion which are respectively located on two opposite sides thereof. First and second pivot members are pivotally disposed on the first lateral portion. A first supporting frame includes a first and second first legs which are pivotally engaged with said pivot members respectively and a bottom bracket which is disposed between said first legs. Each first leg has a bending portion formed thereon and adapted to for corresponding to a ground surface. The bending portion is located between said first leg and the bottom bracket. A handle is mounted between the two first legs and are oppositely located relative to the bottom bracket.

Two pin members are respectively mounted on the bending portions. The first legs are perpendicularly arranged relative to the bottom bracket. A first supporting unit is pivotally disposed between the second lateral portion of the base frame and the first supporting frame. The first supporting frame includes two pairs of pivoting plates which are mounted on the two first legs. Each pivoting plate has a substantially inclined positioning portion formed thereon. A second supporting frame includes first and second second legs pivotally and respectively engaging with the first and second first legs. Each second leg has an end section formed on one end thereof and oppositely corresponds to the bottom bracket of the first supporting frame. Two wheels are pivotally disposed on the end sections. A second supporting unit is pivotally disposed between the pivot members and said second legs of the second supporting frame. An operating unit is mounted on the first supporting frame. The operating unit includes a pedal shaft, a push lever, a coupling member, and a spring member. The pedal shaft has a pedaling portion and a pivoting portion respectively formed on two opposite ends thereof. The pivoting portion pivotally engages with the first supporting frame such that the pedal shaft is pivotable relative to the first supporting frame. The push lever has a first end which is pivotally engaged with one of the first legs of the first supporting frame and a second end for corresponding to the base frame. The push lever is spacely located relative to the pedal shaft. The coupling member is pivotally disposed between the pedal shaft and the push lever. The coupling member has a first pivoting section and a second pivoting section formed on two opposite ends thereof. The first pivoting section and the second pivoting section are respectively and pivotally engaging with the pedal shaft and the push lever. The spring member has two ends respectively abutting against the pedaling portion of the pedal shaft and the first end of the push lever. A resilient force of the spring member constantly biases the pedaling portion and the first end to orient toward each other. A securing unit is mounted on the first lateral portion of the base frame. The securing unit includes a tubular member which is mounted on the first lateral portion, an elastic member which is disposed in the tubular member; and a retaining shaft which passes through the tubular member and the elastic member. The retaining shaft has an abutting end formed on one end thereof. The abutting end selectively protrudes from the tubular member for corresponding to one of the pivot members. An actuating member is mounted on another end of the retaining shaft and protruded from the tubular member.

In an extended configuration, the first supporting frame and the second supporting frame are outwardly extending away from each other such that the bottom bracket of the first supporting frame and the end sections of the second supporting frame are located at their farthest distance apart. The second supporting unit securely positioned the second supporting frame relative to the first supporting frame. The abutting end of the retaining shaft of the securing unit abuts against a bottom of the corresponding pivot member for preventing mis-operation.

In a folding configuration, the first supporting frame and the second supporting frame are oriented toward each other in a substantially parallel arranged manner; the base frame is arranged in a substantially upright manner such that the second lateral portion of the base frame is located adjacent to the first supporting frame.

The present disclosure can achieve the following effects: by utilizing the first supporting unit and the second supporting unit, the first supporting frame and the second supporting frame are outwardly extended relative to the first supporting frame such that the are the first supporting frame and the second supporting frame are positioned outwardly away from each other for extending the collapsible stand. By lifting the first supporting frame, the second supporting frame is retractedly movable toward the first supporting frame, such that the collapsible stand can be easily folded. Thereby, the collapsible stand in accordance with the present disclosure can be easily and quickly folded/extended.

DETAILED DESCRIPTION OF THE PREFERRED EMBODIMENTS

Figure 1:
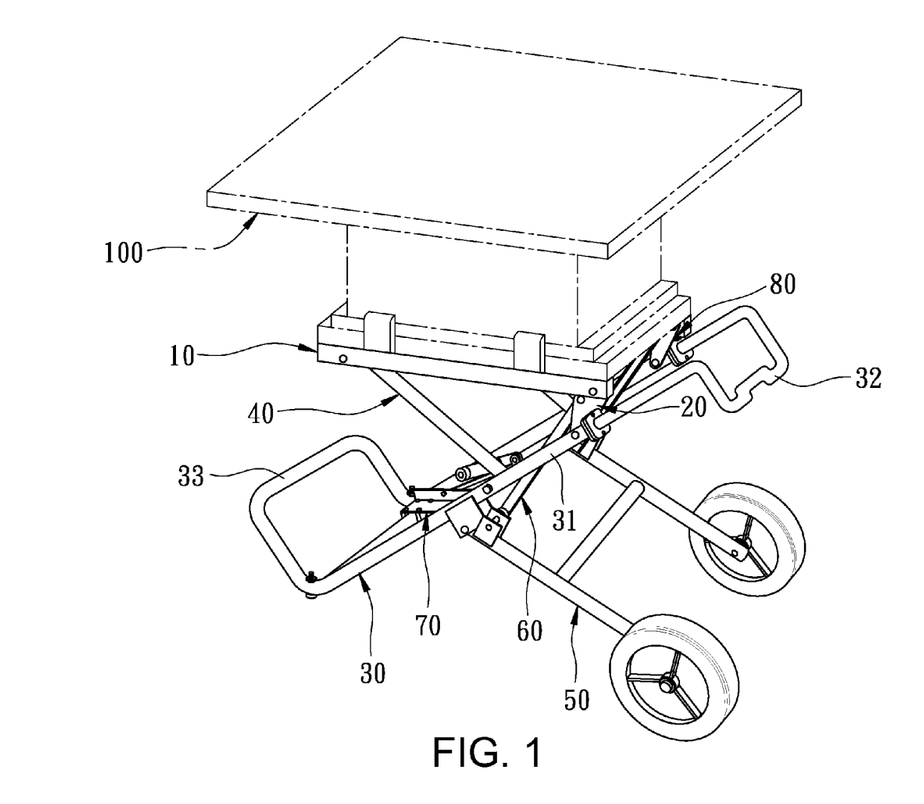
FIG. 1 is a perspective view of a rapidly collapsible stand in accordance with a preferred embodiment of the present disclosure.
Figure 2:
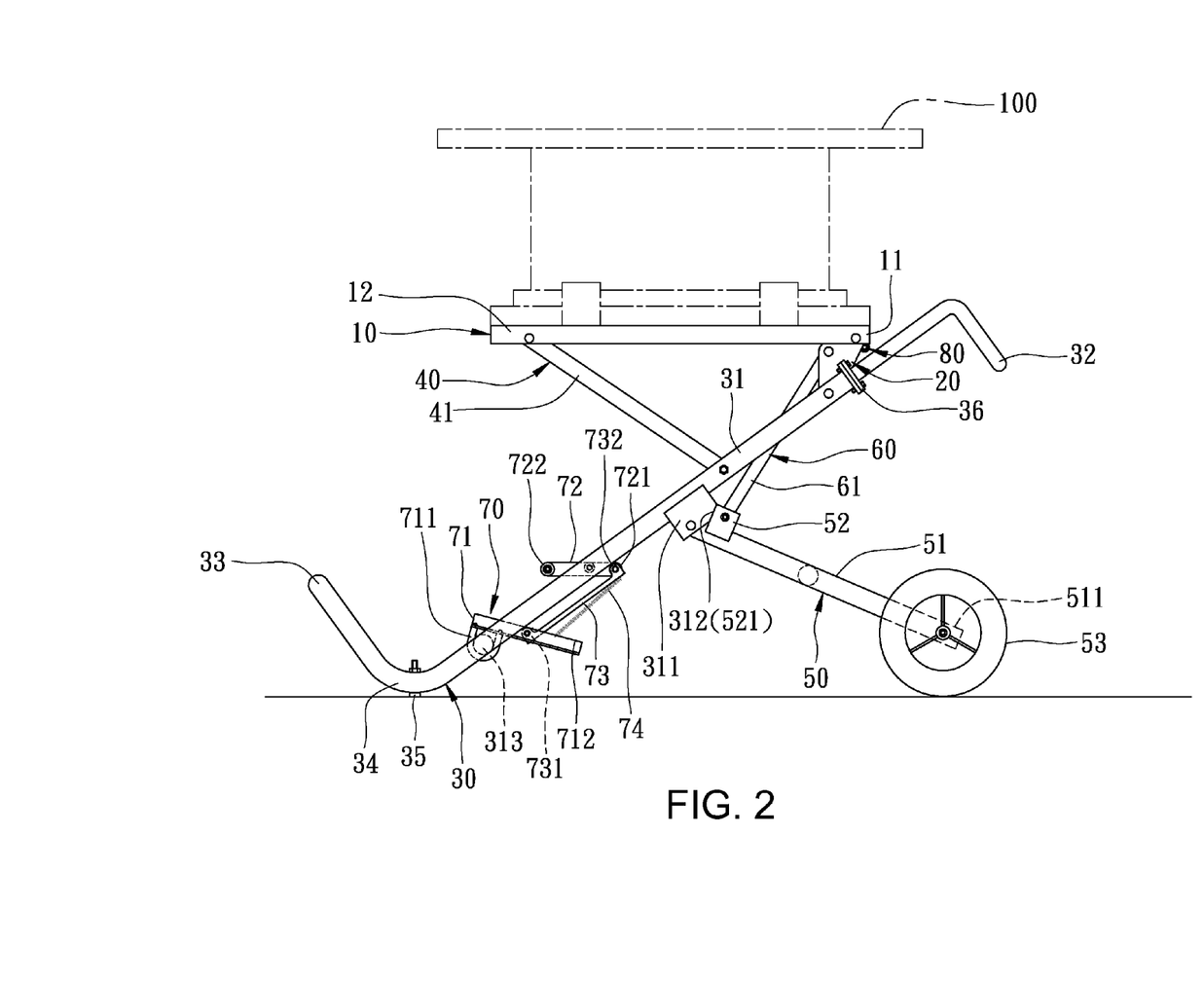
FIG. 2 is an assembled side view of the rapidly collapsible stand in accordance with the preferred embodiment of the present disclosure, wherein the collapsible stand is in an extended configuration.

An embodiment of a collapsible stand according to the present disclosure is shown in FIGS. 1-2, the collapsible stand includes a base frame 10 which is adapted for supporting a machine tool 100. The base frame 10 is substantially rectangular. The base frame 10 has a first lateral portion 11 and a second lateral portion 12 which are respectively located on two opposite sides thereof. First and second pivot members 20 pivotally and respectively disposed on two lateral sides of the first lateral portion 11. The pivot members 20 are substantially triangular.

Figure 3:
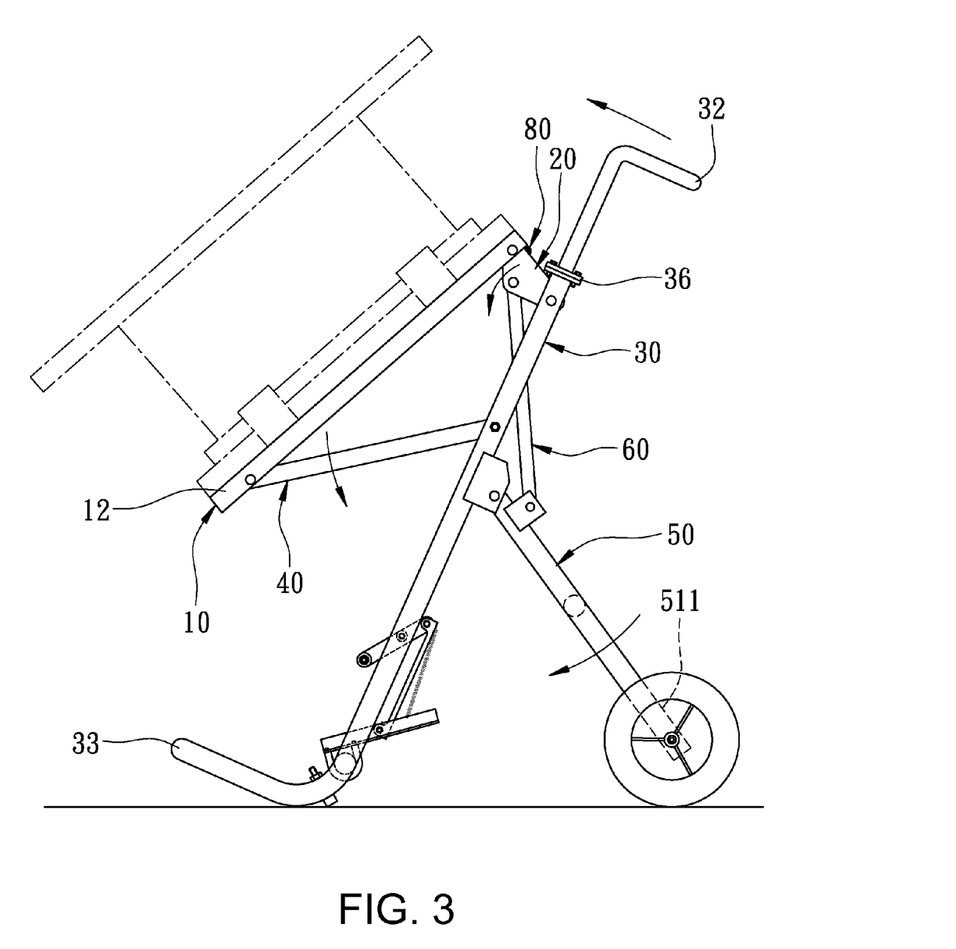
FIG. 3 is a side view of the rapidly collapsible stand in accordance with the preferred embodiment of the present disclosure, wherein the collapsible stand is operated to covert from the extended configuration to a folding configuration.

A first supporting frame 30 includes first and second first legs 31, a bottom bracket 33 adapted for corresponding to a ground surface, and a handle 32. The first and second first legs 31 are pivotally and respectively engaged with the first and second pivot members 20 of the first lateral portion 11. Each first leg 31 has a bending portion 34 formed thereon. The bending portion 34 is substantially arc-shaped. The bottom bracket 33 is disposed between said first legs 31. The handle 32 is also mounted between said first legs 31 and is located on an opposite end of said first legs 31 relative to the bottom bracket 33. Two pin members 35 are mounted on the bending portions 34. A pivoting rod 313 is mounted between the bending portions 34 of said first legs 31. As shown in FIGS. 2-3, said first legs 31 are perpendicularly arranged relative to the bottom bracket 33 such that said first legs 31 and the bottom bracket 33 configured a L-shape. Two pairs of pivoting plates 311 are mounted on said first legs 31 and located at an intermediate portion on the two first legs 31. Each first leg 31 of the first supporting frame 30 has a locking unit 36 mounted thereon for mounting the handle 32 between said first legs 31. The handle 32 and the first legs 31 configured a L-shape. The handle 32 and the bottom bracket 33 are substantially positioned in an invertedly symmetrical manner. Each pivoting plate 311 has a substantially inclined positioning portion 312 formed thereon.

A first supporting unit 40 is pivotally disposed between the second lateral portion 12 of the base frame 10 and the first supporting frame 30. The first supporting unit 40 includes a pair of supporting legs 41. Each supporting leg 41 has two ends respectively and pivotally engaging with the second lateral portion 12 and the corresponding first leg 31 of the first supporting frame 30.

A second supporting frame 50 includes first and second second legs 51 pivotally and respectively engaging with the first and second first legs 31 of the first supporting frame 30. Each second leg 51 has an end section 511 formed on one end thereof and oppositely corresponds to the bottom bracket 33 of the first supporting frame 30. Two pairs of auxiliary panels 52 are disposed on said second legs 51 and are correspondingly located adjacent to the pivoting plates 311. Each auxiliary panel 52 has a substantially planar-shape retaining portion 521 formed thereon and corresponding to the pivoting plate 311. Two wheels 53 are pivotally disposed on the end sections 511 of the second legs 51.

A second supporting unit 60 which is adapted for positioning the second supporting frame 50 relative to the first supporting frame 30 is pivotally disposed between the pivot members 20 and the second legs 51 of the second supporting frame 50. The second supporting unit 60 includes a pair of supporting members 61, each supporting member 61 has two ends respectively and pivotally engaging with the corresponding pivot members 20 and the corresponding auxiliary panel 52 of the second leg 51 of the second supporting frame 50.

An operating unit 70 is mounted on the first supporting frame 30. The operating unit 70 includes a pedal shaft 71, a push lever 72, a coupling member 73, and a spring member 74. The pedal shaft 71 has a pedaling portion 712 and a pivoting portion 711 formed on two opposite ends thereof. The pivoting portion 711 is pivotally engaged with the pivoting rod 313 of the first supporting frame 30 such that the pedal shaft 71 is pivotable relative to the first supporting frame 30. The push lever 72 has a first end 721 which is pivotally engaged with one of the first legs 31 of the first supporting frame 30 and a second end 722 for corresponding to the base frame 10. The push lever 72 is spaced apart from the pedal shaft 71 the pedal shaft 71 such that that push lever 72 is not interfered by the pedal shaft 71 during operation and vice versa. The coupling member 73 is pivotally disposed between the pedal shaft 71 and the push lever 72. The coupling member 73 has a first pivoting section 731 and a second pivoting section 732 formed on two opposite ends thereof. The first pivoting section 731 and the second pivoting section 732 are respectively and pivotally engaging with the pedal shaft 71 and the push lever 72. The first pivoting section 731 is pivotally connected to the pedal shaft 71 and is located between the pivoting portion 711 and the pedaling portion 712 of the pedal shaft 71; whereas the second pivoting section 732 is pivotally connected to the first end 721 of the push lever 72. The spring member 74 is disposed between the push lever 72 and the pedal shaft 71. Two ends of the spring member 74 abut against the pedaling portion 712 of the pedal shaft 71 and the first end 721 of the push lever 72. The spring member 74 provides a resilient force which is arranged to constantly bias the pedaling portion 712 and the first end 721 to orient toward each other.

Figure 8:
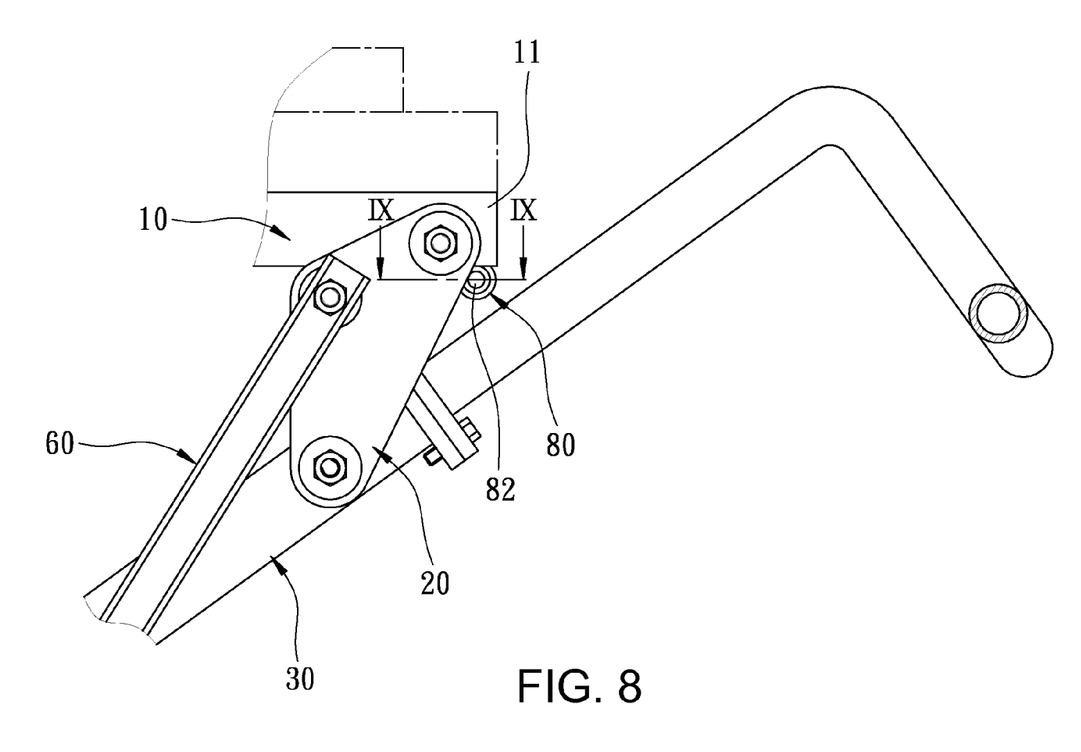
FIG. 8 is a front plan view of a securing unit in accordance with the preferred embodiment of the present disclosure, wherein the securing unit is mounted on a first lateral portion of a base frame in accordance with the present disclosure.
Figure 9:
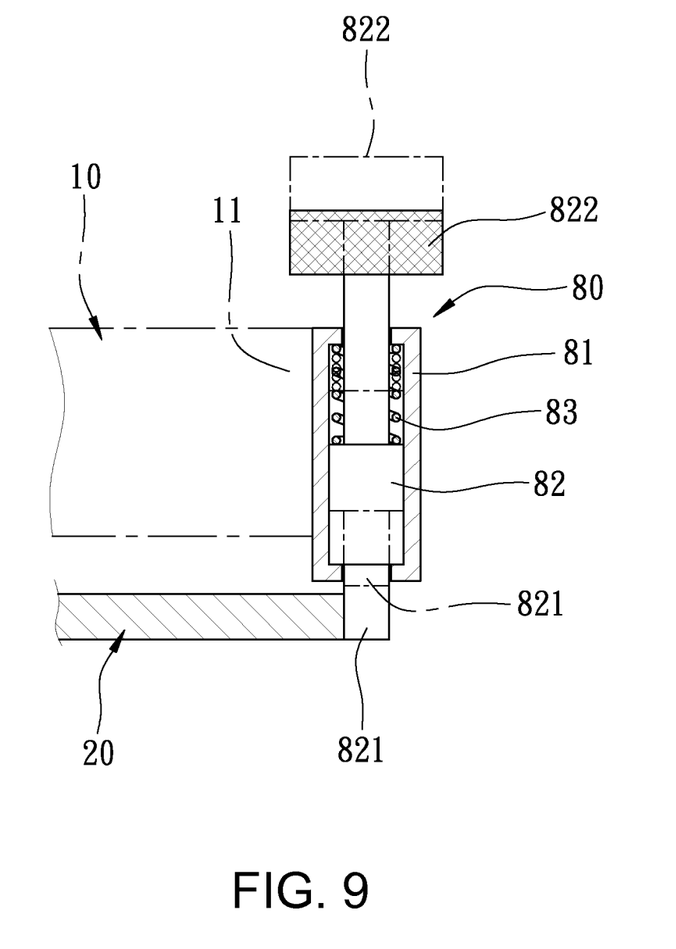
FIG. 9 is a cross-sectional view taken along line IX-IX of FIG. 9

Further referring to FIGS. 8-9, a securing unit 80 is mounted on the first lateral portion 11 of the base frame 10. The securing unit 80 includes a tubular member 81 mounted on a bottom of the first lateral portion 11, an elastic member 83 disposed in the tubular member 81, and a retaining shaft 82 passes through the tubular member 81. The retaining shaft 82 has an abutting end 821 formed on one end thereof and selectively protrudes from the tubular member 81 for corresponding to one of the pivot members 20. An actuating member 822 is mounted on another end of the retaining shaft 82 and is protruded from the tubular member 81.

As shown in FIG. 2, when the collapsible stand in accordance with the present disclosure is in an extended configuration, the first supporting frame 30 and the second supporting frame 50 are positioned outwardly away from each other such that the bottom bracket 33 of the first supporting frame 30 and the end sections 511 of the second supporting frame 50 are located at their farthest distance apart. The first supporting frame 30 and the second supporting frame 50 are tiltedly positioned on the ground surface for stably supporting the base frame 10. The base frame 10 is substantially in a horizontal position relative to the ground surface. The supporting members 61 of the second supporting unit 60 slightly urge the auxiliary panels 52 which are disposed on the second legs 51 of the second supporting frame 50 such that the retaining portions 521 correspondingly mesh with the positioning portions 312 of the pivoting plates 311. Thereby, the first supporting frame 30 and the second supporting frame 50 are retained tiltedly positioned relative to the ground surface such that the collapsible stand is stably maintained in the extended configuration. The pin members 35 are resting on the ground surface for ensuring the collapsible stand is stably positioned.

As shown in FIGS. 8 and 9, in the extended configuration, the abutting end 821 of the retaining shaft 82 is protruded from the tubular member 81 and abuts against a bottom of the corresponding pivot member 20 for preventing mis-operation.

When an user wishes to transport the machine tool 100 which is disposed on the base frame 10 from one location to another, he/she simply needs to exert a downward force to the handle 32, such that the pin members 35 mounted on the bending portions 34 are lifted from the ground surface, thereby the user can easily transport the machine tool 100 via the wheels 53 on the second supporting frame 50.

Moreover, referring to FIGS. 3-5 and FIG. 9, in order to convert the collapsible stand in accordance with the present disclosure from the extended configuration to a folding configuration, the user first pulls the actuating member 822 of the retaining shaft 82 such that the abutting end 821 is pulled to disengage from the bottom of the corresponding pivot member 20. Simultaneously, the user lifts up the handle 32 such that the first lateral portion 11 is lifted and the first supporting frame 30 is driven to pivotally retract. The second supporting frame 50, driven by the movement of the first supporting frame 30, is likewise pivotally retracted toward the first supporting frame 30. The first supporting frame 30 and the second supporting frame 50 are brought closer together until the first supporting frame 30 and the second supporting frame 50 are uprightly positioned relative to the ground surface and are arranged substantially parallel relative to each other. The positioning portions 312 of the pivoting plates 311 and the retaining portions 521 of the auxiliary panels 52 are thereby disengaged. The second supporting unit 60 is driven by movement of the second supporting frame 50 such that the supporting members 61 of the second supporting unit 60 drives the pivot members 20 to pivotally rotate for consequently, driving the first lateral portion 11 of the base frame 10. The base frame 10 is therefore pivotally tilted from the horizontal position to a fully upright position with the second lateral portion 12 orienting toward the ground surface and closely located adjacent to the first supporting frame 30. The bottom bracket 33 and the end sections 511 which are located at their farthest distance apart in the extended configuration are drawn toward each other and are closely located adjacent to each other in the folding configuration.

Figure 4:
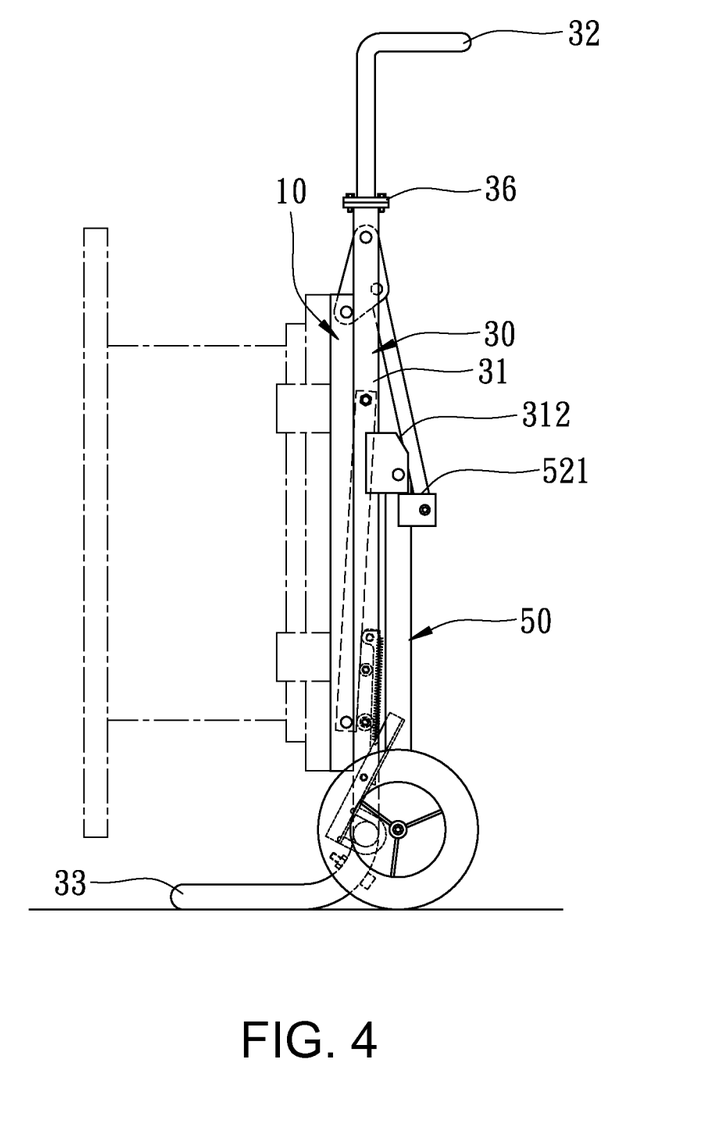
FIG. 4 is a side view of the rapidly collapsible stand in accordance with the preferred embodiment of the present disclosure, wherein the collapsible stand is in the folding configuration.
Figure 5:
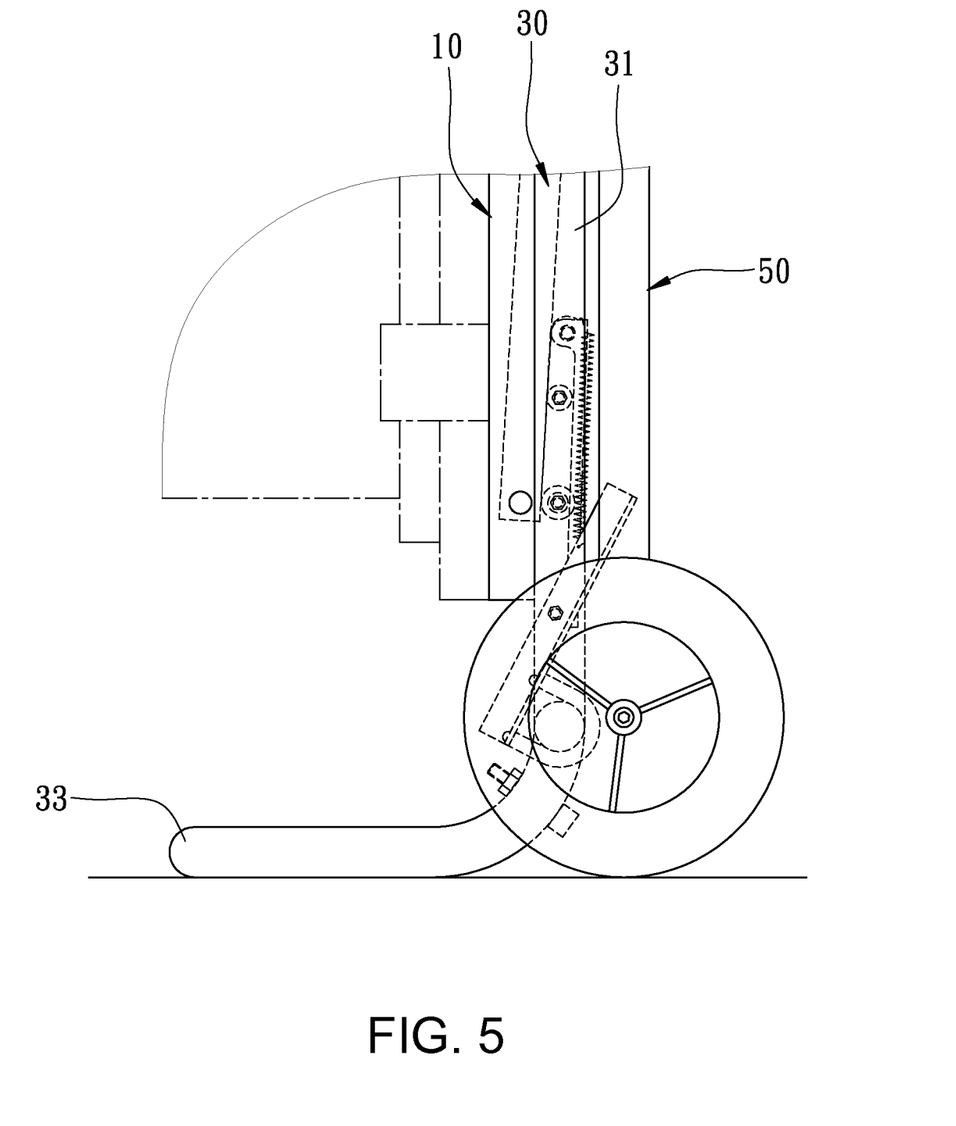
FIG. 5 is a partial enlarged view of FIG. 4.

As shown in FIGS. 4 and 5, when the collapsible stand in accordance with the present disclosure is fully folded, it is reduced to a compact size for convenient storage. Furthermore, the bottom bracket 33 of the first supporting frame 30 rests on the ground surface for stably supporting the collapsible stand in the folding configuration. Furthermore, the handle 32 can be dismounted from the locking unit 36, thereby, effectively reducing a packing size of the collapsible stand in accordance with the present disclosure.

Figure 6:
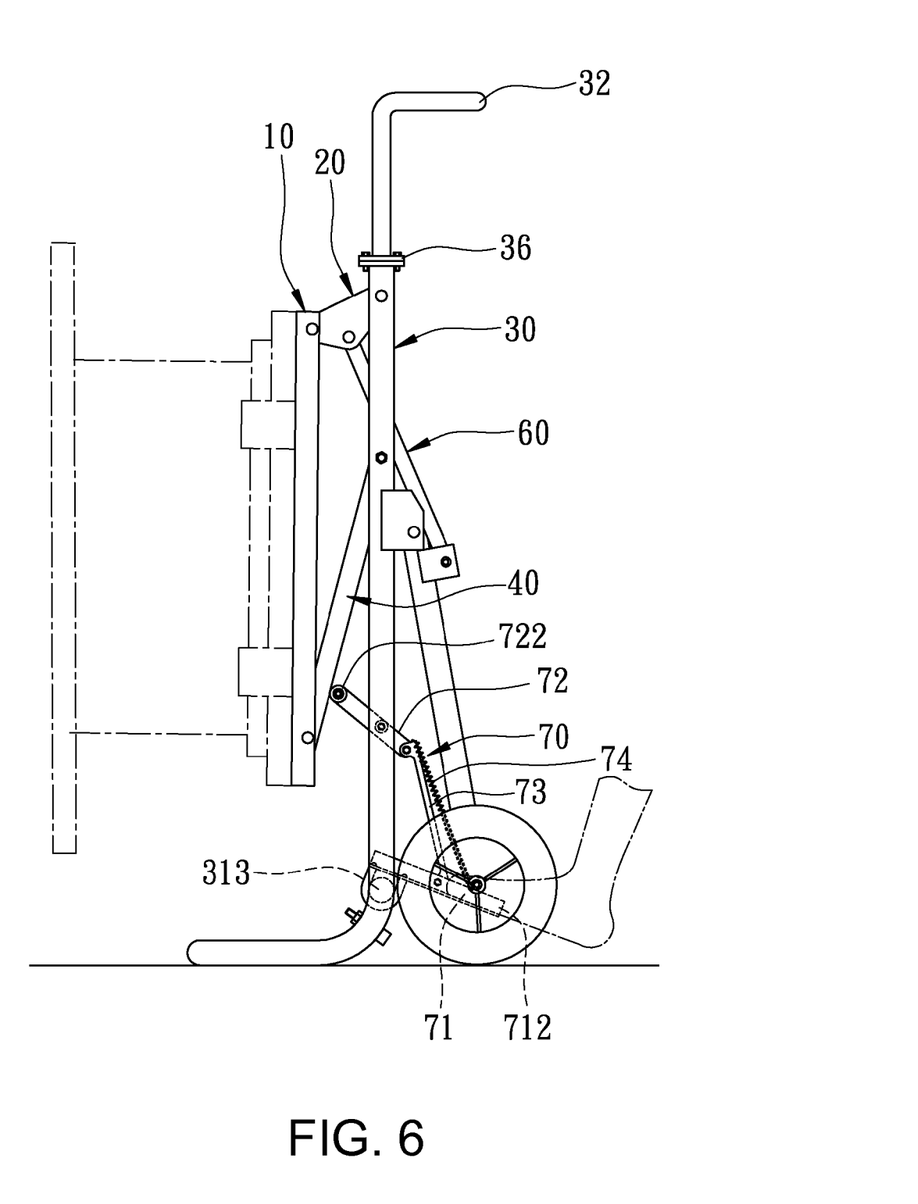
FIG. 6 is a side view of the rapidly collapsible stand in accordance with the preferred embodiment of the present disclosure, wherein the collapsible stand is operated to convert from the folding configuration to the extended configuration.
Figure 7:
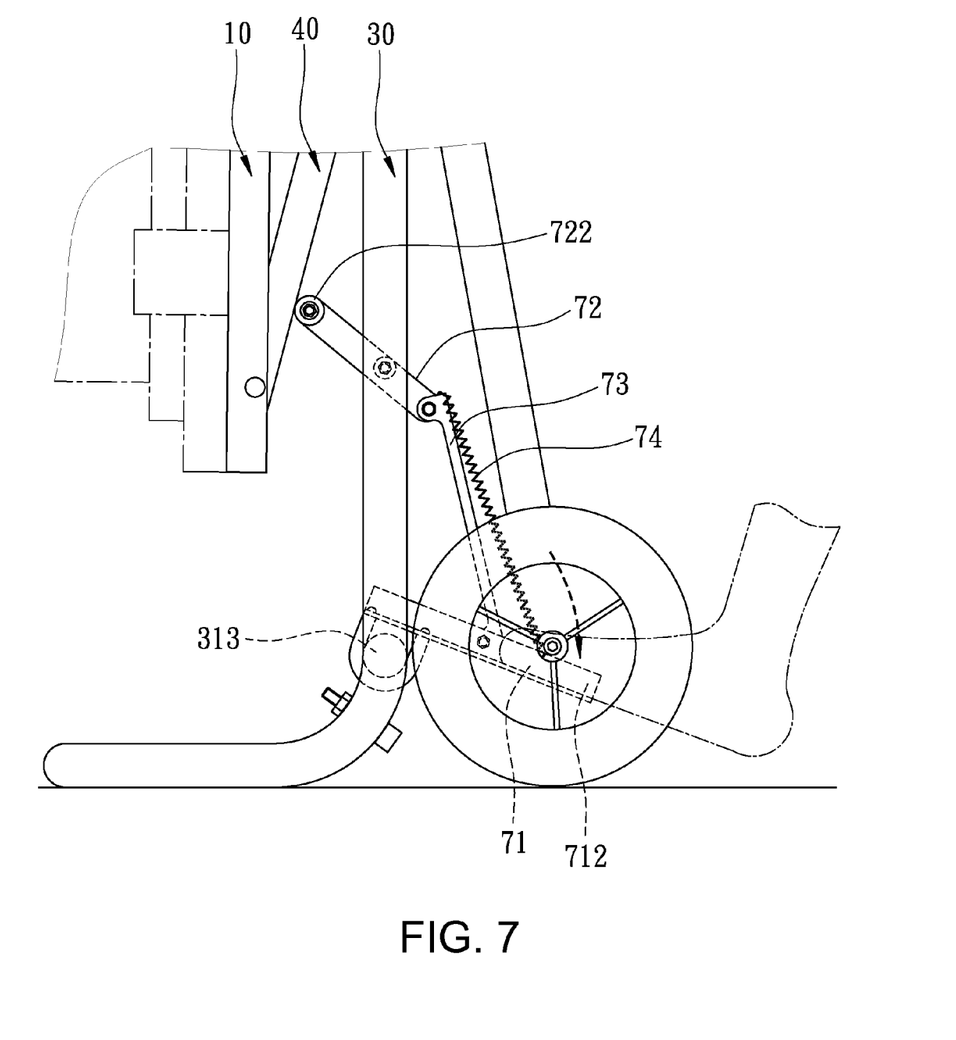
FIG. 7 is a partial enlarged view of FIG. 6.

Further referring to FIGS. 6 and 7, when the user intends to convert the collapsible stand in accordance with the present disclosure from the folding configuration to the extended configuration shown in FIGS. 1 and 2, the user pedals on the pedaling portion 712 of the pedal shaft 71, thereby the pedal shaft 71 is pivotally rotated relative to the pivoting rod 313 to pivotally drive the coupling member 73 such that the push lever 72 is driven by the pivotal movements of the coupling member 73 (When the pedaling portion 712 is pedaled, the spring member 74 is expanded to store resilient force for elastic recovery). The first supporting unit 40 is urged by the second end 722 of the push lever 72 to drive the second lateral portion 12 of the base frame 10 outwardly away from the first supporting frame 30. The pivot members 20 are driven by movements of the base frame 10, such that the pivot members 20 drive the second supporting unit 60 to yield pivotal movements for positioning the second supporting frame 50. By continuously exerting downward force on the handle 32, the first supporting frame 30 and the second supporting frame 50 continue to move outwardly away from each other until the bottom bracket 33 of the first supporting frame 30 and the end sections 511 of the second supporting frame 50 are located at their farthest distance apart as in the extended configuration shown in FIGS. 1 and 2.

When the pedaling portion 712 is released, the spring member 74 elastically recovers such that the pedal shaft 71, the push lever 42, and the coupling member 73 are driven to return to their original positions as shown in FIGS. 4 and 5.

In view of the above, the collapsible stand in accordance with the present disclosure is easy to operate, and can be folded/extended quickly.

Although particular embodiments of the disclosure have been described in detail for purposes of illustration, various modifications and enhancements may be made without departing from the spirit and scope of the disclosure. Accordingly, the disclosure is not to be limited except as by the appended claims.

What is claimed is:
1. A rapidly collapsible stand comprising:
a base frame adapted for supporting a machine tool, the base frame having a first lateral portion and a second lateral portion respectively located on opposite sides of the base frame;
first and second pivot members pivotally disposed on the first lateral portion;

a first supporting frame including first and second first legs pivotally engaging with the first and second pivot members, respectively, and a bottom bracket disposed between the two first legs;

a first supporting unit pivotally disposed between the second lateral portion of the base frame and the first supporting frame;

a second supporting frame including first and second second legs pivotally coupled to the first and second first legs, respectively, each of the second legs defining an end section oppositely positioned relative to the bottom bracket of the first supporting frame; and a second supporting unit for positioning the second supporting frame relative to the first supporting frame and pivotally coupled to said pivot members and said second legs;

wherein, in an extended configuration, the first supporting frame and the second supporting frame are positioned outwardly away from each other such that the bottom bracket of the first supporting frame and the end sections of the second supporting frame are generally located at their farthest distance apart, the second supporting unit securely positioning the second supporting frame relative to the first supporting frame;

wherein, in a folding configuration, the first supporting frame and the second supporting frame are oriented substantially parallel toward each other, the base frame is arranged substantially upright such that the second lateral portion of the base frame is located adjacent to the first supporting frame.

2. The rapidly collapsible stand according to claim 1 further comprising an operating unit mounted on the first supporting frame, the operating unit includes:

a pedal shaft having a pedaling portion and a pivoting portion respectively formed on two opposite ends of the pedal shaft, the pivoting portion pivotally engaging the first supporting frame such that the pedal shaft is pivotable relative to the first supporting frame;

a push lever having a first end pivotally engaged with one of the first legs of the first supporting frame and a second end, the push lever being spaced apart from the pedal shaft; and a coupling member pivotally disposed between the pedal shaft and the push lever, the coupling member having first and second pivoting sections formed on two opposite ends thereof, the first and second pivoting sections pivotally engaging the pedal shaft and the push lever, respectively;

wherein:

in the folding configuration, by applying a pedal force on the pedaling portion, the coupling member is driven by the pedal shaft to drive the push lever such that the second end of the push lever urges the second lateral portion of the base frame to drive the second lateral portion away from the first supporting frame.

3. The rapidly collapsible stand according to claim 2, wherein the operating unit further includes:

a spring member disposed between the push lever and the drive shaft, the spring member defining first and second ends abutting against the pedaling portion of the driving shaft and the first end of the push lever, respectively, the spring member providing a resilient force arranged to constantly bias the pedaling portion and the first end to orient toward each other.

4. The rapidly collapsible stand according to claim 1, wherein the second supporting frame has at least one wheel pivotally mounted on the end sections of the two second legs.

5. The rapidly collapsible stand according to claim 1, wherein each of the first and second first legs has a bending portion formed thereon and located along the two first legs, the bottom bracket being adapted for corresponding to a ground surface in the extended configuration and the two first legs are perpendicularly arranged relative to the bottom bracket.

6. The rapidly collapsible stand according to claim 5 further comprising two pin members respectively mounted on the bending portions of the two first legs.

7. The rapidly collapsible stand according to claim 1, wherein the first supporting frame includes two pairs of pivoting plates mounted on the two first legs respectively and located at an intermediate portion on the two first legs, each pivoting plate having a substantially inclined positioning portion formed thereon, each of the first and second second legs having two auxiliary panels disposed thereon and located adjacent to the pivoting plates, each auxiliary panel having a substantially planar-shape retaining portion formed thereon and corresponding to the pivoting plate;

wherein:

in the extended configuration, the retaining portions respectively mesh with the positioning portions;

in the folding configuration, the retaining portions are disengaged from the positioning portions.

8. The rapidly collapsible stand according to claim 1 further comprising:

a securing unit mounted on the first lateral portion of the base frame, the securing unit including a tubular member mounted on the first lateral portion, an elastic member disposed in the tubular member, and a retaining shaft passing through the tubular member and the elastic member and having an abutting end formed on a first end thereof, the abutting end selectively protruding from the tubular member for corresponding to one of the pivot members;

an actuating member mounted on a second end of the retaining shaft and protruding from the tubular member;

wherein, when the first and second supporting frames are positioned outwardly away from each other, the abutting end of the retaining shaft abuts against a bottom of the corresponding pivot member for preventing mis-operation.

9. The rapidly collapsible stand according to claim 1, wherein the first supporting frame has a handle mounted between the two first legs and oppositely located relative to the bottom bracket.

10. The rapidly collapsible stand according to claim 1, wherein each of the two first legs has a locking unit mounted thereon for securely fixing the handle between the two first legs.

11. A rapidly collapsible stand comprising:

a base frame adapted for supporting a machine tool, the base frame having at least a first lateral portion on a side of the base frame;

at least one pivot member pivotally disposed on the first lateral portion;

a first supporting frame including at least one first leg pivotally engaging with the pivot member and a bottom bracket disposed along the at least one first leg;

a first supporting unit pivotally disposed between a lateral portion of the base frame and the first supporting frame;

a second supporting frame including at least one second leg pivotally coupled with the at least one first leg, each of the at least one second legs defining an end section oppositely positioned relative to the bottom bracket of the first supporting frame; and a second supporting unit for positioning the second supporting frame relative to the first supporting frame and pivotally coupled to the pivot member and the at least one second leg of the second supporting frame.

12. The rapidly collapsible stand according to claim 11, wherein in an extended configuration where the first supporting frame and the second supporting frame are positioned outwardly away from each other such that the bottom bracket of the first supporting frame and the end section of the second supporting frame are located at their farthest distance apart, lifting the first supporting frame can move the second supporting frame toward the first supporting frame such that the collapsible stand can be collapsible.

13. The rapidly collapsible stand according to claim 12, wherein each of the at least one first leg has a locking unit mounted thereon for securely fixing the handle relative to the at least one first leg.

14. A rapidly collapsible stand comprising:
a base frame adapted for supporting a machine tool, the base frame having at least one lateral portion on a side of the base frame;
at least one pivot member pivotally disposed on the at least one lateral portion;
a first supporting frame including at least one first leg pivotally engaging with the pivot member and a bottom bracket disposed along the at least one first leg;
a first supporting unit pivotally disposed between the at least one lateral portion of the base frame and the first supporting frame, and said first supporting unit includes a handle located opposite to the bottom bracket;
a second supporting frame including at least one second leg pivotally coupled with the at least one first leg, each of the at least one second legs defining an end section oppositely positioned relative to the bottom bracket of the first supporting frame; and
a second supporting unit for positioning the second supporting frame relative to the first supporting frame and pivotally coupled to the pivot member and the at least one second leg of the second supporting frame;
an operating unit mounted on the first supporting frame and arranged to urge the at least one lateral portion of the base frame to drive the at least one lateral portion away from the first supporting frame when the rapidly collapsible stand is converted from a folding configuration to an extended configuration.

15. The rapidly collapsible stand according to claim 14, wherein the handle is selectively secured on the at least one first leg to reduce packaging size.

16. The rapidly collapsible stand according to claim 14, wherein in a folding configuration, applying downward force on the handle moves the first supporting frame and second supporting frame outwardly away from each other until the bottom bracket and end section of the second supporting frame are located at their farthest distance apart.

17. The rapidly collapsible stand according to claim 14, wherein the operating unit includes a pedal shaft having a pedaling portion and a pivoting portion respectively formed on two opposite ends of the pedal shaft.

18. The rapidly collapsible stand according to claim 17, wherein the pivoting portion pivotally engages the first supporting frame such that the pedal shaft is pivotable relative to the first supporting frame.

19. The rapidly collapsible stand according to claim 17, wherein the operating unit includes a push lever having a first end pivotally engaged with the at least one first leg of the first supporting frame and a second end, the push lever being spaced apart from the pedal shaft.

20. The rapidly collapsible stand according to claim 19, wherein the operating unit further includes a coupling member pivotally disposed between the pedal shaft and the push lever, the coupling member having first and second pivoting sections formed on two opposite ends thereof, the first and second pivoting sections pivotally engaging the pedal shaft and the push lever, respectively.

* * * * *